United States Patent
Spiller

[11] 3,887,261
[45] June 3, 1975

[54] LOW-LOSS REFLECTION COATINGS USING ABSORBING MATERIALS

[75] Inventor: Eberhard A. Spiller, Mt. Kisco, N.Y.

[73] Assignee: International Business Machines Corporation, Armonk, N.Y.

[22] Filed: Mar. 23, 1973

[21] Appl. No.: 344,405

[52] U.S. Cl. .................. 350/1; 350/155; 350/164
[51] Int. Cl. .................. G02b 5/28; G02b 5/30
[58] Field of Search .............. 350/1, 155, 164–166, 350/152; 117/33.3

[56] References Cited
UNITED STATES PATENTS

| | | | |
|---|---|---|---|
| 3,428,388 | 2/1969 | Kuebler | 350/152 |
| 3,712,980 | 1/1973 | Norton | 350/166 |

OTHER PUBLICATIONS

Schroeder, "Jour. of the Optical Society of America," Vol. 52, No. 12, Dec. 1962, pp. 1380–1386.

Turner, "Jour. de Physique et le Radium," Vol. 11, No. 7, July 1950, pp. 444–460.

Kard, "Optics and Spectroscopy," Vol. 9, No. 3, Sept. 1960, pp. 200–204.

Hunter, "Optica Acta," Vol. 9, No. 3, July 1962, pp. 255–268.

*Primary Examiner*—Ronald J. Stern
*Attorney, Agent, or Firm*—John J. Goodwin

[57] ABSTRACT

A class of multi-layer reflectors using a plurality of low-loss reflective elements composed of absorbing materials in the form of thin films is described wherein the differences between the absorption indices of the materials are used to obtain reflecting boundaries. The class of reflector structures are designed in such a manner that when light is directed onto the structure, a standing wave is generated throughout the structure. Absorbing materials in the nodes of the standing wave do not absorb but absorbing materials in the antinodes provide enhanced absorption.

1 Claim, 4 Drawing Figures

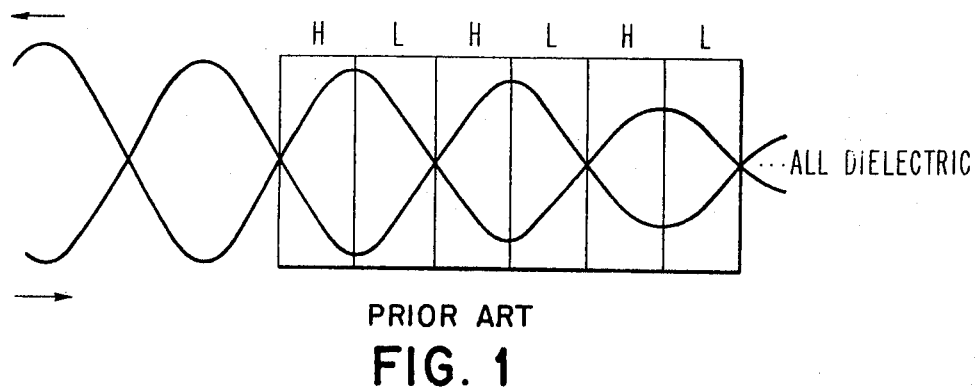
PRIOR ART
FIG. 1
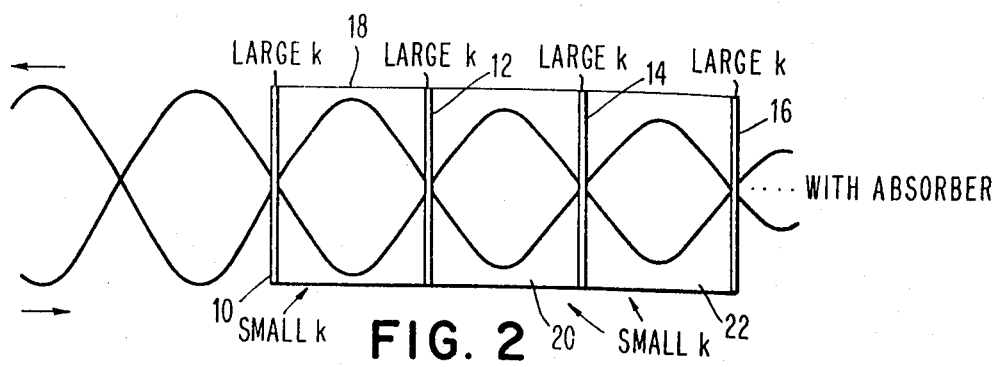
FIG. 2
$I(z) \propto z^2$
$A \propto \int_{-d/2}^{d/2} k\, I(z)\, dz \propto k d^3$
$R \propto d^2$
$A/R \propto d$
FIG. 3
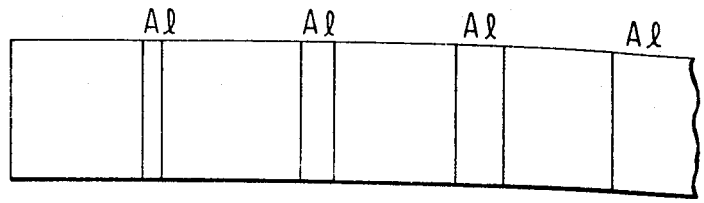
FIG. 4

LOW-LOSS REFLECTION COATINGS USING ABSORBING MATERIALS

BACKGROUND OF THE INVENTION

1. Field of the Invention

The present invention relates to the field of reflective devices for use in optical systems and more particularly to reflective devices using absorbing materials.

2. Prior Art

There are two publications which provide background for the present invention. They are "Optimization of Multilayer Soap Crystals for Ultrasoft X-Ray Diffraction" by M. W. Charles, Journal of Applied Physics, Vol. 42, No. 9, August 1971, at pp. 3329–3356 and "X-Ray Diffraction by Multilayered Thin Film Structures and Their Diffusion," by J. B. Dinklage, Journal of Applied Physics, Vol. 38, No. 9, pp. 3781–3785, August 1967.

The Charles publication provides a review of the state of the art. The Dinklage publication describes multilayer structures which from outward appearance seem similar to the present invention. The distinction of the present invention over the cited publications, and what is considered significant, is that the present invention employs strong absorbing layers. Furthermore, a unique difference over the prior art is that a class of high reflectivity devices are obtained by the teachings of the present invention since materials of different absorption constants are alternated.

SUMMARY OF THE INVENTION

Multilayer dielectric interference coatings have become well known devices in optics. However, due to the fact that such devices have been limited to the use of nonabsorbing materials of alternate high and low refractive index, such coatings could not be used for relatively short wavelengths.

It is therefore an object of the present invention to provide reflective or interference devices including coatings using absorbing materials.

Another object of the present invention is to provide reflective devices which can be used for relatively short wavelengths in the ultraviolet down to the ultrasoft X-ray region.

It is a further object of the present invention to provide devices employing absorbing materials which may be employed as optical mirrors, polarizers, beam splitters, interference filters and antireflection coatings.

BRIEF DESCRIPTION OF THE DRAWINGS

FIG. 1 is a representative illustration of a typical prior art high reflectivity mirror composed of high and low refractive index materials.

FIG. 2 is an illustration of an embodiment of a reflection coating device according to the present invention employing thin absorption layers positioned in the nodes of the standing wave generated by the incident and reflected light waves.

FIG. 3 is an illustration showing how, in a thin film absorber layer, positioned in a node of a standing wave, it can be calculated that the absorption losses can be made arbitrarily small compared to the reflection.

FIG. 4 is an illustration of an embodiment of a nonperiodic reflective structure wherein the thickness of absorbing layers monotonically vary from one end of the structure to the other.

DESCRIPTION OF THE PREFERRED EMBODIMENTS

Multilayer mirrors, or more generally multilayer interference coatings, have found wide use in optics as reflective devices. Such devices, however, have avoided absorbing materials to obtain low loss coatings. FIG. 1 shows a schematic illustration of an example of a typical prior art multilayer mirror wherein all dielectric elements are employed and the mirror elements alternate between high and low refractive index materials, designated in FIG. 1 as H and L. As previously discussed, the prior art dielectric mirrors are not effective for short light wavelengths below, for example, 2,500 Angstroms because absorption free materials of high refractive index are not available. The present invention, on the other hand, has obtained new, unusual and effective results by the fabrication of multilayer interference coatings using alternate materials of different absorption constants, embodied particularly as high absorber thin film structures separated by spacers of low absorption index. FIG. 2 is a schematic illustration of an embodiment of the present invention wherein thin layers 10, 12, 14 and 16 of a strong absorber are positioned in the nodes produced by the superpositions of the incident and reflected waves separated by spacer materials 18, 20 and 22 having a low absorption index. The structure of FIG. 2 employs the differences between the absorption indices $k$ of the materials to obtain reflecting boundaries and each reflection coating is designed in such a way that a standing wave exists throughout it. The strong absorber in the nodes of the standing waves do not absorb due to the low light intensity around a node, however, the spacer material has low absorption losses due to its small absorption index.

FIG. 3 is an illustration indicating how it can be calculated in a thin film absorber structure consisting of layers as shown in FIG. 1, that for a thin film absorber layer in a node of a standing wave, the absorption losses (designated as A) can be made relatively small compared to the reflection (designated as R) if the thickness is decreased.

The theoretical basis for the structure of FIG. 2 will now be provided. Every discontinuity of the complex refractive index represented as $\hat{n}$ ($\hat{n} = n + ik$) of each layer of reflective structure causes a reflection of an incident wave at this discontinuity. This reflection is very small if the change in the optical constants is very small; however, if more layers and therefore more boundaries N are provided in such a way that all add in phase to the reflected wave, then the reflected intensity increases proportional to the square of the number of boundaries $N^2$ until it reaches a final value due to, either depletion of the incident beam, or due to absorption. Without absorption, all the energy is in the reflected beam when the incident beam is depleted and a reflectivity R = 1 can be obtained with arbitrarily small differences in the refractive index. If absorbing films are used, it has been previously assumed that additional absorption losses will limit the reflectivity obtainable to much lower values. This assumption, however, is wrong as will now be shown by the following theorem:

Reflectivities approaching R = 1 can be obtained with multilayer structures using absorbing films. Because it is known that a reflectivity approaching R = 1 can be obtained with multilayer structures of lossless films of arbitrarily small reflectivity, it is only necessary to illustrate that the absorption losses of such a reflector using absorbing films can also be made arbitrarily small.

In front of and inside a reflector with R = 1 there exists a perfect standing wave with zero intensity in its nodes. Away from the node of the standing wave, the intensity increases quadratically with distance. A very thin absorbing film (absorption index $k$, thickness $d$,) positioned in the node of the standing wave has an absorption loss $$A \propto \int_{-d/2}^{+d/2} k\, I(z)\, dz \propto \int_{-d/2}^{+d/2} k\, z^2\, dz \propto d^3 \quad (1)$$

The reflections from the front side and back side of this film cancel each other to a large extent with the remaining reflectivity being expressed as $$R \propto d^2 \quad (2)$$

Equations (1) and (2) show that the absorption losses of the film decrease faster than its reflectivity for a decrease in the thickness of the film. Therefore, the absorption losses can be made arbitrarily small compared to the reflectivity if thinner and thinner films are used. In the limit, a very thin film is equivalent to an absorption-free film of low reflectivity which proves the theorem.

A multilayer structure of arbitrarily small losses and high reflectivity is pprovided in the present invention by using many of these films spaced in such a way that they all add in phase to the reflected wave. The space between the absorbing films contains the antinodes of the standing wave in this design and has to be completely absorption-free.

The concepts described herein provide the teaching as to how to reduce absorption losses in multilayer structures of absorbing materials. The concept can be used to provide high reflectivity mirrors where the standing wave is most pronounced as well as for other devices such as beam splitters or other partly reflecting mirrors which produce wave fields which have less pronounced standing waves, and also for polarizers, interference filters and antireflection coatings. For each practical design there exists an optimum performance which can be reached with a finite number of layers.

The equation for the particular design of the multilayer structures of absorbing materials are not considered necessary to provide in this writing since the calculations are straight forward and may be calculated on an electronic computer using the matrix method described in the text "Principles of Optics", by M. Born and E. Wolf, 3rd Edition, Pergamon Press, 1965, p. 51. For example, it has been found that a coating with a maximum (or minimum) can be obtained for some quantity like reflectivity, absorption in certain layers, etc., by starting from an initial design and proceeding along the gradient of this quantity with respect to some parameters (usually the thickness of each layer) until an extreme has been reached.

In general, the optimum design depends on the number of layers to be employed in conjunction with the optical constants of each layer. The reflectivity obtainable for a mirror increases with the number of layers and with the value of the Fresnel coefficient between adjacent layers and it decreases for increasing $k$ of the spacer layer. The maximum reflectivity obtainable with many layers ($N \to \infty$) depends only on the ratio $k_H/k_L$ for the case that all layers have the same refractive index and $k_H << 1$ (wherein $k_H$, $k_L$ are the absorption indices of the absorber and the spacer layer). While the maximum reflectivity obtainable for $N \to \infty$ depends only on $k_L/k_H$, the number of layers required to come close to this maximum reflectivity depends on the values of the absorption indices itself: for smaller values of $k$, more layers are needed. For a wavelength $\lambda = 300$ A only 10 periods are needed to obtain the largest possible reflectivity while about 100 periods are necessary for $\lambda = 70$ A.

Specific applications for the present invention will now be described with the respect to the designated headings.

INTERFERENCE COATINGS FOR WAVELENGTHS IN THE REGION FROM 50 - 900 ANGSTROMS

Mirrors

In the wavelengths from 50 - 900 A, no single material has a substantial reflectivity at normal incidence, the reflectivities available decrease with decreasing wavelength. The refractive indices of all materials are close to one in this region. The absorption indices show more variations. The highest absorption indices available at each wavelength are about a factor of fifty larger than the lowest. No absorption-free material is practically available.

The best design for highest reflectivity is not the periodic structure of FIG. 2 but a slightly modified version of FIG. 2 which is a non-periodic structure where the thicknesses of the absorber layers increase from one end to the other end of the structure, that is, from the front end where the optical wave enters to the back end, the coating (substrate) of the coating. The reason is that the standing wave is more pronounced at the front of the multilayer coating than in the deeper layers. For an optimum design therefore the first absorber layers will be thinner than the deeper ones; all the light which passes the last layer is transmitted and lost for reflection, therefore in a mirror for maximum reflectivity the last layer has the same thickness as that single film which gives the maximum reflectivity.

Possible materials for the 50 - 900 A range are listed in Table I. The materials, such as thin films, are arranged alternately according to their high $k$ and small $k$ as shown in FIG. 2 in any combination or permutation. The most optimum combination is that which combines the highest with the lowest value of the absorption index. It is expected that many more materials can be used whose optical constants are not known at the present time. Besides having proper optical constants, the boundary between the materials selected has to be stable. Many more possibilities for stable boundaries are expected if not only elements but also compounds such as metal oxides are used.

TABLE I

| LARGE $k$ | | SMALL $k$ | |
|---|---|---|---|
| Material | Wavelength (A) | Material | Wavelength (A) |
| Au | 200 - 900 | Mg | 250 - 900 |
| Pt | 100 - 900 | Al | 170 - 600 |

TABLE I-Continued

| | LARGE k | | SMALL k |
|---|---|---|---|
| Ir | 100 – 900 | Si | 130 – 350 |
| Re | 100 – 900 | Be | 120 – 600 |
| Os | 100 – 900 | C | 50 – 300 |
| Rh | 100 – 900 | | |
| W | 100 – 900 | | |
| $Al_2O_3$ | 100 – 900 | | |

Polarizers

A mirror used at non-normal incidence has different reflectivities for s and p-polarization and can, in the present invention, be used as a polarizer. The degree of polarization $R_s/R_p$ obtainable from one boundary depends on the optical constants and can be maximized by adjusting the angle of incidence. If a multilayer coating is used instead of a single boundary, the obtainable degree of polarization practically does not change, however, because the reflectivity can be increased, a multilayer structure gives a much larger intensity and larger ratios $R_s/R_p$ become possible by using several reflections.

Beam Splitters

The reflectivities possible in the 50 – 900 Angstroms range are too small and the absorption losses too high to make multiple beam interferometers (Fabry - Perot interference filters) useful devices. If an element for wavelength selection is wanted, it is better to use a mirror coating of small bandwidth (i.e., with many layers) or to cascade several mirrors. For a two beam interferometer such as a Michelson interferometer, some absorption losses can be tolerated. With a multilayer structure, the absorption losses can be reduced, however, the reduction is smaller than for a mirror of higher reflectivity because a beam splitter which produces also a transmitted beam always produces less pronounced standing waves than a mirror of higher reflectivity and no transmittance.

INTERFERENCE COATINGS FOR THE NEAR VACUUM ULTRAVIOLET RANGE (1100 – 2500 A)

Normally, a single film of aluminum has a much better optical performance in the wavelength region between 1100 and 2500 A than any multilayer structure possible in the 50 – 900 A range. In accordance with the present invention, further improvement can be obtained when the aluminum film is replaced by multilayer structures. Because non-absorbing materials are available in this wavelength region, in theory ideal elements with no absorption can be produced. In practice the required high quality of the spacer layer is the most important obstacle to obtain better and better elements. Spacer layers which are completely free of absorption and scattering are needed for the ideal element.

High reflectivity mirrors

High reflectivity mirrors can be obtained by overcoating an opaque aluminum film with a multilayer structure of spacer layers and thin aluminum films. The process can be described as positioning very thin aluminum films into the nodes in front of the opaque film in such a way that they boost the reflectivity of this film. The optimum design for highest reflectivity is again a design with the thickness of the aluminum films decreasing from the substrate to the top of the coating.

Beam Splitters and Interference Filters

Using the described design principle, it is also possible to find multilayer designs which have a higher transmission than a single aluminum film but maintain the reflectivity. Optimum designs for this purpose are very close to the design given in FIG. 2. These designs can be used as low loss beam splitters. If these designs are used as the mirrors in a Fabry-Perot interferometer, interference filters which greatly improved performance over those possible with prior art and described by Bates and Bradley, Journal of Applied Optics, Volume 5, pg. 971 (1966), become possible. The new filters can be made to have higher peak transmission and smaller transmission bandwidth.

Antireflection Coatings for Photodetectors

Antireflection coatings are used to increase optically the efficiency of photodetectors. In the ultraviolet, however, the use of the standard designs is limited because a substantial fraction of the incident light is absorbed in the coating and not in the photosensitive material. Because our design principle can be used to reduce the absorption losses in absorbing filters, we can use it also to reduce the absorption losses in the antireflection coating itself enhancing this way the absorption in the photosensitive material.

Conclusion

In conclusion, what has been described is a design principle which can reduce the absorption losses of an absorbing film by generating a standing wave and positioning the absorber into the nodes of this standing wave. It is obvious that the standing wave can be utilized also to enhance absorption by positioning the absorbing films into the antinodes.

Besides this, the described method is not limited to a reduction or enhancement of an absorption; any other optical effects can be reduced or enhanced in a similar way. Some effects which can be reduced or enhanced this way are magneto-optical and electro-optical effects like Faraday-rotation, Cotton-Mouton effect, Kerr effect, Pockels effect, birefringence, dichroism, nonlinear optical effects, gain in laser oscillators and amplifiers. The design concept and embodiments thereof described has, therefore, applications for improved light modulators, deflectors, beam addressable memories and optical displays using any of the mentioned effects.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A reflective structure for optical waves comprising an array of alternate layers of high and low absorbing elements wherein said alternate layers are coated on top of each other, said array including a plurality of thin film elements having a relatively high absorption index separated by and coated on material having a relatively low absorption index to provide an alternating difference in said absorption indices to produce a plurality of reflecting boundaries which, when positioned in the path of an incident optical wave produce standing incident and reflected waves as a result of said differences in said absorption indices, said alternate layers being arranged relative to each other so that said high absorption elements are located in the nodes of said incident and reflected waves to form a nonperiodic structure wherein the thickness of the absorbing layers monotonically vary from one end of said array to the other, said thinner absorbing layers being located at the end of said array in the path of said incident optical wave.

* * * * *